US012710950B2

(12) United States Patent
Ryali et al.

(10) Patent No.: US 12,710,950 B2
(45) Date of Patent: Aug. 18, 2026

(54) MONITORING SOFTWARE UPGRADES FOR DEPLOYMENT VERIFICATION AND COMPATIBILITY

(71) Applicant: BANK OF AMERICA CORPORATION, Charlotte, NC (US)

(72) Inventors: Venkata Karthik Ryali, Hyderabad (IN); Durga Prasad Kutthumolu, Hyderabad (IN); Suryanarayana Adivi, Hyderabad (IN); Albin Vinod Martin, Besant Nagar (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 213 days.

(21) Appl. No.: 18/133,207

(22) Filed: Apr. 11, 2023

(65) Prior Publication Data

US 2024/0345819 A1 Oct. 17, 2024

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS 8,615,529 B2 12/2013 Reiner
8,694,824 B2 4/2014 Howard
8,850,507 B2 9/2014 Reisman
9,432,350 B2 8/2016 Anderson
9,569,539 B2 2/2017 Siddiqui
9,734,169 B2 8/2017 Redlich
9,911,093 B2 3/2018 Whitmore
9,916,233 B1 * 3/2018 Qureshi ............. G06F 11/3688
10,104,110 B2 10/2018 Oliphant
10,248,397 B2 4/2019 Dain
10,514,978 B1 12/2019 Lee
10,528,454 B1 * 1/2020 Baraty ................ G06F 11/3684
10,609,063 B1 3/2020 Oliphant
10,656,607 B2 5/2020 Patel
10,884,636 B1 1/2021 Abrol
10,949,338 B1 * 3/2021 Sirianni ................ G06N 20/10
11,057,237 B2 7/2021 Ansari
(Continued)

*Primary Examiner* — Wei Y Mui
*Assistant Examiner* — Travis Viet Tran
(74) *Attorney, Agent, or Firm* — Moore & Van Allen PLLC; Nicholas C. Russell

(57) ABSTRACT

A system is provided for automated and intelligent implementation of computing software upgrades. In particular, the system may generate one or more log files associated with one or more applications in a client computing layer, perform preprocessing of the one or more log files using one or more preprocessing algorithms, analyze the one or more log files using a first classification algorithm, determine, using the first classification algorithm, one or more impacted applications that require compatibility verification, analyze the one or more log files of the one or more impacted applications using a second classification algorithm, determine, using the second classification algorithm, one or more verified applications that operate without the compatibility issue, and deploy the one or more verified applications to at least one of the user device or the server environment.

14 Claims, 4 Drawing Sheets

(56) References Cited

U.S. PATENT DOCUMENTS

| | | | | |
|---|---|---|---|---|
| 11,108,859 | B2 | 8/2021 | Das | |
| 11,184,233 | B1 | 11/2021 | Neelakantam | |
| 11,360,459 | B2 | 6/2022 | Cella | |
| 11,616,839 | B2 | 3/2023 | Sharma | |
| 2006/0130040 | A1* | 6/2006 | Subramanian | G06F 8/65 717/168 |
| 2015/0199188 | A1* | 7/2015 | Mantripragada | G06F 21/121 717/101 |
| 2016/0335414 | A1* | 11/2016 | Isaacs | G16H 40/40 |
| 2018/0176318 | A1 | 6/2018 | Rathod | |
| 2018/0367434 | A1* | 12/2018 | Kushmerick | H04L 41/0896 |
| 2019/0196938 | A1* | 6/2019 | Mathen | G06F 18/295 |
| 2019/0361697 | A1 | 11/2019 | Hu | |
| 2020/0026589 | A1* | 1/2020 | Ghosh | G06F 11/0793 |
| 2022/0179991 | A1* | 6/2022 | Jha | G06F 11/3065 |

* cited by examiner

MONITORING SOFTWARE UPGRADES FOR DEPLOYMENT VERIFICATION AND COMPATIBILITY

FIELD OF THE INVENTION

The present invention embraces a system for automated and intelligent implementation of computing software upgrades.

BACKGROUND

There is a need for an efficient and secure way to perform software upgrades to address computing vulnerabilities.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for automated and intelligent implementation of computing software upgrades. In particular, the system may continuously monitor computing application log files from one or more applications within a network environment. The system may analyze and/or preprocess the logs using one or more artificial intelligence-based algorithms (e.g., natural language processing algorithms) recommended processes or pathways for automatically upgrading the applications. Based on the upgrade processes or pathways, the system may initiate a two-step application check to determine which applications may be impacted by the software upgrade and/or a software compatibility issue and which ones are not impacted. Applications that are not impacted may be upgraded and deployed to a server layer within the network environment. That said, applications that are impacted by the software upgrade and/or software compatibility issue may be instantiated or deployed in a cloud environment (e.g., a multi-cloud environment) using an auto-configuration script, where the cloud environment may spool up containers as necessary to accommodate the deployed applications. In this way, the system provides an intelligent way to perform application upgrades and distribute computing load across multiple different computing environments.

Accordingly, embodiments of the present disclosure provide a system for automated and intelligent implementation of computing software upgrades, the system comprising a processing device; a non-transitory storage device containing instructions when executed by the processing device, causes the processing device to perform the steps of continuously generating one or more log files associated with one or more applications in a client computing layer; performing preprocessing of the one or more log files using one or more preprocessing algorithms; processing the one or more log files using a first classification algorithm, wherein the first classification algorithm determines whether the one or more applications are impacted by a software upgrade; processing the one or more log files using a second classification algorithm, wherein the second classification algorithm determines whether the one or more applications are impacted by a compatibility issue.

In some embodiments, processing the one or more log files using the first classification algorithm comprises determining that a first group of applications of the one or more applications is not impacted by the software upgrade; and deploying the first group of applications to one or more servers within a server environment.

In some embodiments, processing the one or more log files using the second classification algorithm is performed based on determining that a second group of applications of the one or more applications are impacted by the software upgrade.

In some embodiments, the instructions further cause the processing device to perform the steps of generating an auto configuration script for deploying the second group of applications to a cloud environment; and executing the auto configuration script to deploy the second group of applications into one or more containers within the cloud environment.

In some embodiments, the one or more preprocessing algorithms comprises a noise removal algorithm, wherein the noise removal algorithm is configured to perform at least one of syntax correction, removal of special characters, or formatting changes on the one or more log files.

In some embodiments, the one or more preprocessing algorithms comprises a contextual embedding algorithm, wherein the context embedding algorithm is configured to generate associations between one or more keywords detected in the one or more log files and identified concepts within the one or more log files.

In some embodiments, the compatibility issue comprises a software compatibility issue caused by at least one of a driver conflict, operating system conflict, or outdated libraries.

Embodiments of the present disclosure also provide a computer program product for automated and intelligent implementation of computing software upgrades, the computer program product comprising a non-transitory computer-readable medium comprising code causing an apparatus to perform the steps of continuously generating one or more log files associated with one or more applications in a client computing layer; performing preprocessing of the one or more log files using one or more preprocessing algorithms; processing the one or more log files using a first classification algorithm, wherein the first classification algorithm determines whether the one or more applications are impacted by a software upgrade; processing the one or more log files using a second classification algorithm, wherein the second classification algorithm determines whether the one or more applications are impacted by a compatibility issue.

In some embodiments, processing the one or more log files using the first classification algorithm comprises determining that a first group of applications of the one or more applications is not impacted by the software upgrade; and deploying the first group of applications to one or more servers within a server environment.

In some embodiments, processing the one or more log files using the second classification algorithm is performed based on determining that a second group of applications of the one or more applications are impacted by the software upgrade.

In some embodiments, the code further causes the apparatus to perform the steps of generating an auto configuration script for deploying the second group of applications to a cloud environment; and executing the auto configuration script to deploy the second group of applications into one or more containers within the cloud environment.

In some embodiments, the one or more preprocessing algorithms comprises a noise removal algorithm, wherein the noise removal algorithm is configured to perform at least one of syntax correction, removal of special characters, or formatting changes on the one or more log files.

In some embodiments, the one or more preprocessing algorithms comprises a contextual embedding algorithm, wherein the context embedding algorithm is configured to generate associations between one or more keywords detected in the one or more log files and identified concepts within the one or more log files.

Embodiments of the present disclosure also provide a computer-implemented method for automated and intelligent implementation of computing software upgrades, the computer-implemented method comprising continuously generating one or more log files associated with one or more applications in a client computing layer; performing preprocessing of the one or more log files using one or more preprocessing algorithms; processing the one or more log files using a first classification algorithm, wherein the first classification algorithm determines whether the one or more applications are impacted by a software upgrade; processing the one or more log files using a second classification algorithm, wherein the second classification algorithm determines whether the one or more applications are impacted by a compatibility issue.

In some embodiments, processing the one or more log files using the first classification algorithm comprises determining that a first group of applications of the one or more applications is not impacted by the software upgrade; and deploying the first group of applications to one or more servers within a server environment.

In some embodiments, processing the one or more log files using the second classification algorithm is performed based on determining that a second group of applications of the one or more applications are impacted by the software upgrade.

In some embodiments, the computer-implemented method further comprises generating an auto configuration script for deploying the second group of applications to a cloud environment; and executing the auto configuration script to deploy the second group of applications into one or more containers within the cloud environment.

In some embodiments, the one or more preprocessing algorithms comprises a noise removal algorithm, wherein the noise removal algorithm is configured to perform at least one of syntax correction, removal of special characters, or formatting changes on the one or more log files.

In some embodiments, the one or more preprocessing algorithms comprises a contextual embedding algorithm, wherein the context embedding algorithm is configured to generate associations between one or more keywords detected in the one or more log files and identified concepts within the one or more log files.

In some embodiments, the compatibility issue comprises a software compatibility issue caused by at least one of a driver conflict, operating system conflict, or outdated libraries.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
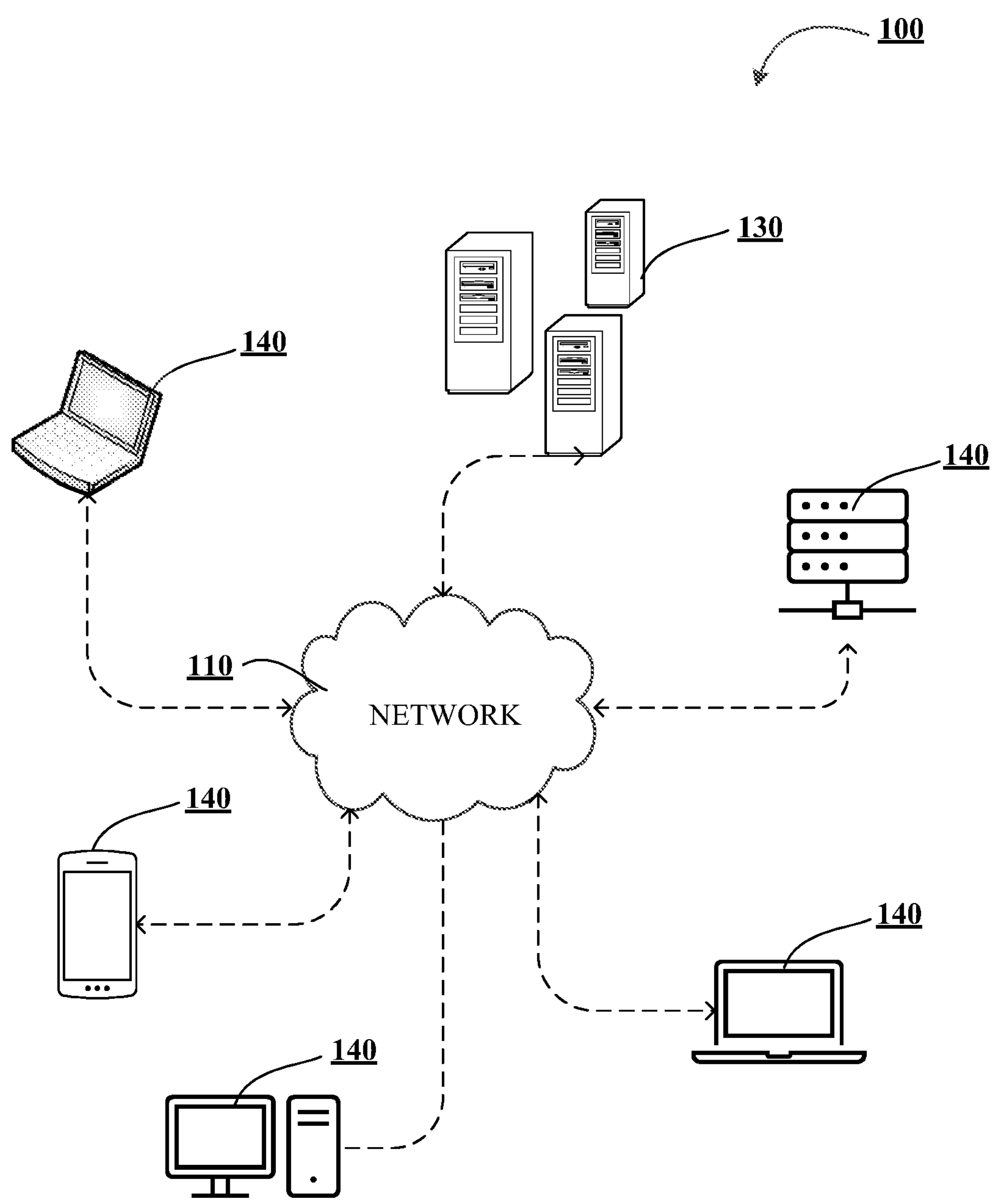
Figure 1B:
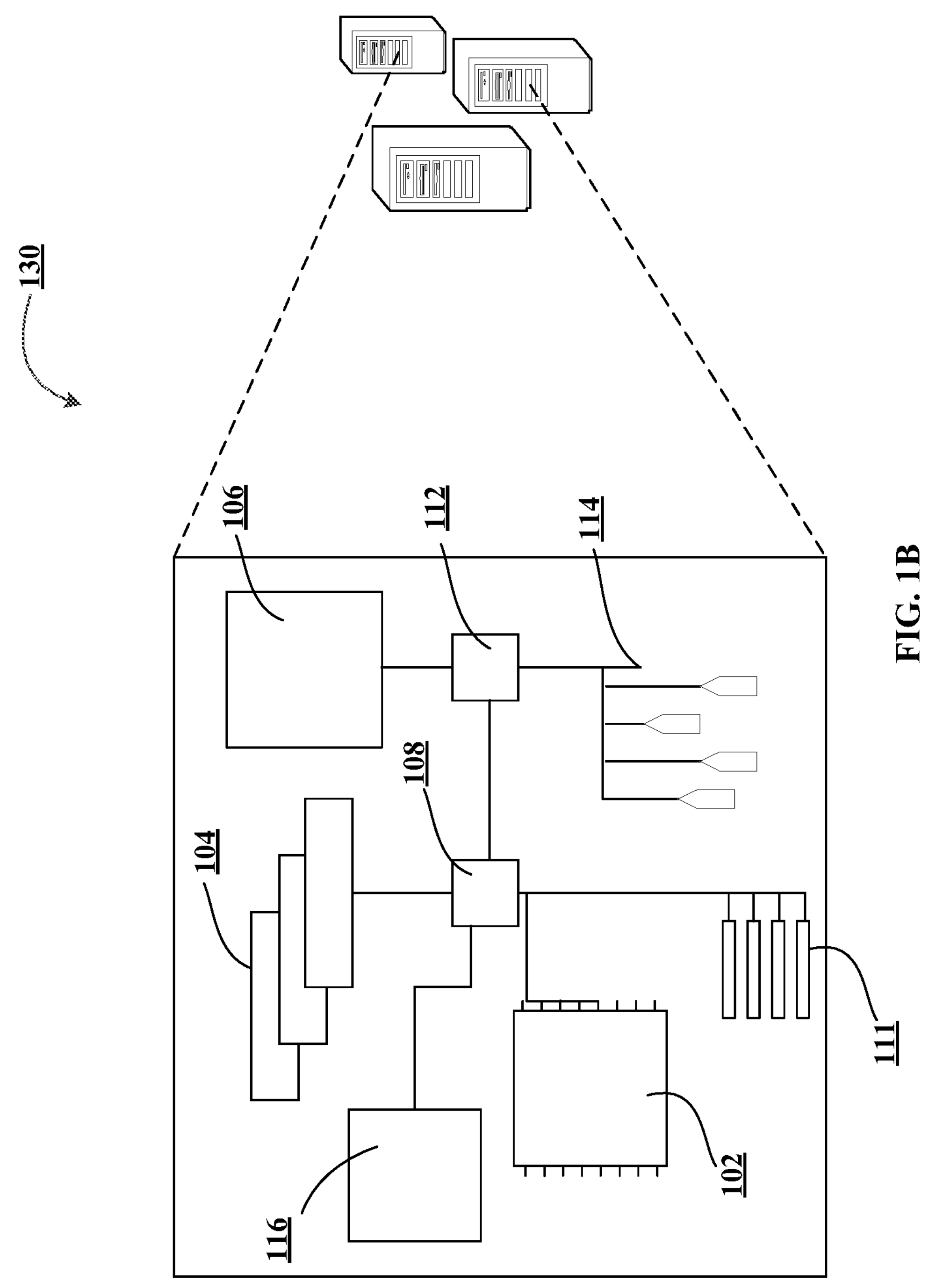
Figure 1C:
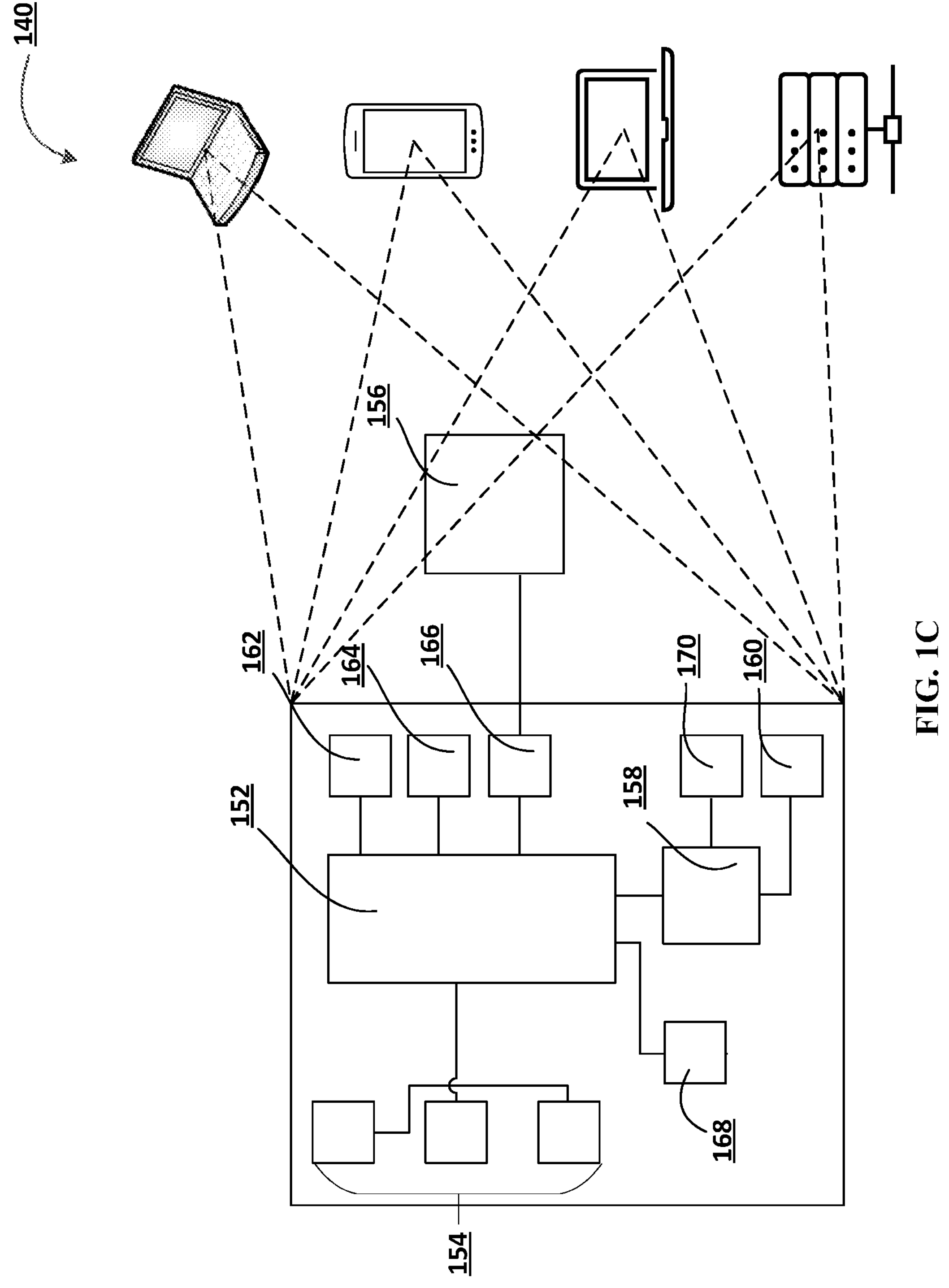
Figure 2:
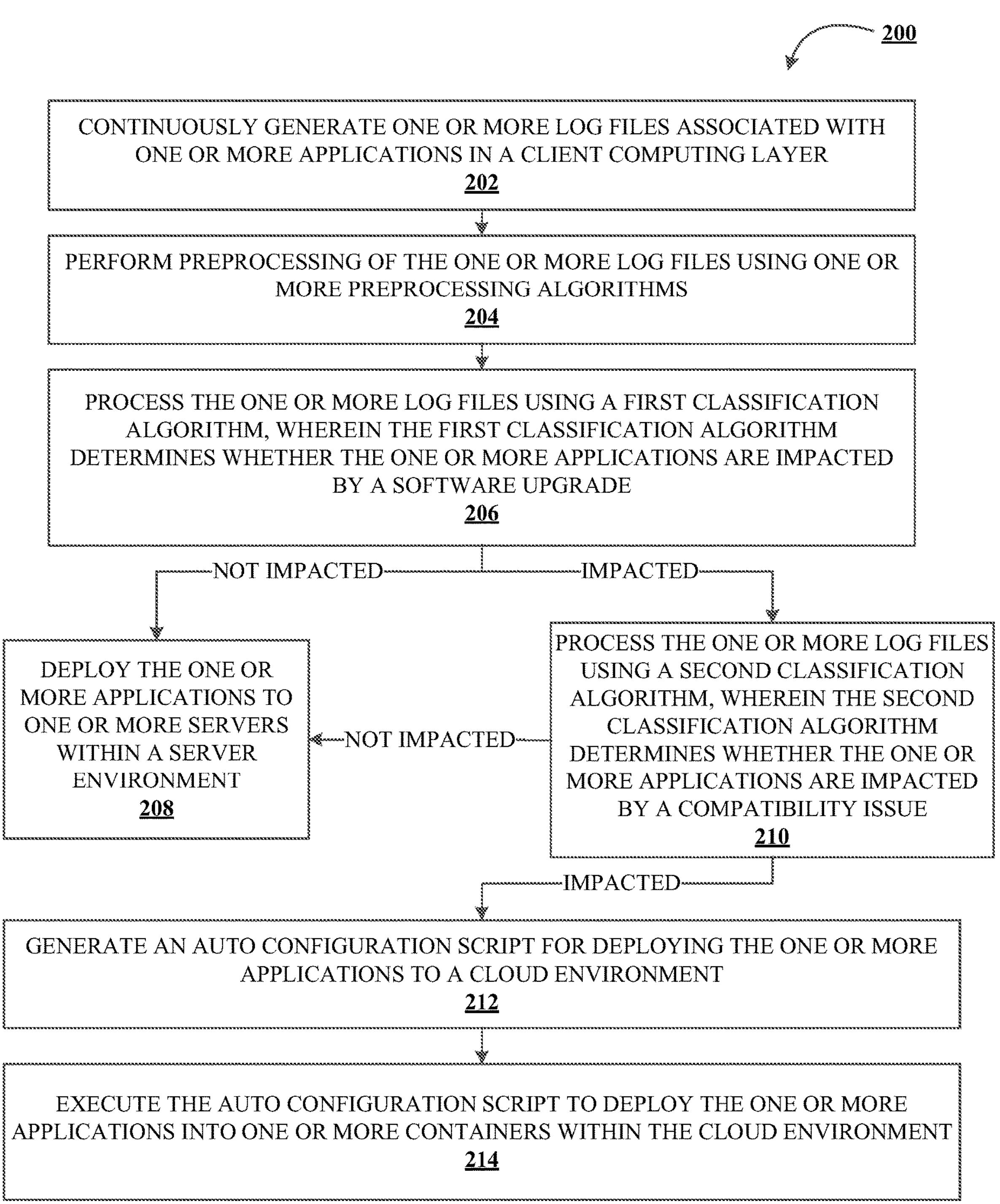

Having thus described embodiments of the invention in general terms, reference will now be made the accompanying drawings, wherein:

FIGS. 1A-1C illustrates technical components of an exemplary distributed computing environment for the system for automated and intelligent implementation of computing software upgrades, in accordance with an embodiment of the present disclosure; and FIG. 2 illustrates a process flow for automated and intelligent implementation of computing software upgrades, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (“GUI”) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, individual characteristic data (e.g., iris recognition, retina scans, fingerprints, finger veins, palm veins, palm prints, digital bone anatomy/structure and positioning of distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and the like.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

As used herein, "application vulnerability" may refer to a weakness in a computing application that may create opportunities for intentional or unintentional negative effects to occur within the application. For instance, certain vulnerabilities may allow unauthorized entities to gain control of or access to the components of the system or environment (e.g., data). In other cases, certain vulnerabilities may cause unintentional issues to occur, such as crashing, freezing, lagging, or other types of malfunctions (e.g., as a result of a software compatibility issue between the application and the environment into which the application is deployed). Accordingly, vulnerabilities may exist from suboptimal configurations or settings, outdated software, design flaws, and/or the like.

As used herein, "container" may refer to real or virtual computing units that may comprise all of the hardware and/or software resources required to execute processing tasks or jobs. The containers may be hosted and operated in both cloud and non-cloud environments independently of other containers. Accordingly, the jobs within the containers may be executed in parallel with one another. In some embodiments, a single container may execute multiple jobs. In other embodiments, one or more processes of a particular resource-intensive or large job or application may be executed across multiple containers in a coordinated, distributed manner.

In order to address computing application vulnerabilities within a computing environment, it is often necessary to perform software upgrades of applications to an updated version of the application and/or migrated to a server environment (e.g., a web server). That said, performing upgrades according to an upgrade schedule (e.g., across an entity's network environment) may cause issues within the computing environment. In particular, upgrading multiple different applications across multiple different environments may cause certain issues to malfunction (e.g., experience freezing, crashing, lagging, bugs, and/or the like) as a result of the upgrade. For instance, upgrading a particular application to its latest version within a particular environment (e.g., a server environment) may cause the application to crash due to a compatibility issue with its existing hardware and/or software environment (e.g., as a result of outdated libraries or dependencies, software or driver conflicts, and/or the like). As such, it may not be possible to perform a simple batch upgrade, as the resulting issues from application downtime and/or malfunctioning may create significant impacts across the network environment, particularly when impacted applications may be components within a dependency chain. Therefore, an intelligent and automated way to perform application upgrades is needed.

To address the technical problems as described above among others, the system as described herein provides for automated and intelligent implementation of computing software upgrades. In this regard, an entity's computing environment may comprise a client application layer comprising one or more applications deployed on one or more client computing systems. The system may continuously generate log files for each of the client applications, where the log files may include information about the application and the hardware and/or software environment into which the application is deployed. The information may include, for example, an application name or identifier, host system name or identifier, host IP address and/or DNS information, operating system information, application version, log timestamps, last application boot times, last scans, and/or the like.

The log files may be analyzed by an information security scanning layer (e.g., a layer that performs a vulnerability scan of the applications within the client layer or other layer) to identify the various vulnerabilities or issues that may exist within one or more applications. Based on identifying the potential vulnerabilities, the log files of applications affected by the vulnerability may be analyzed and processed by one or more preprocessing engines, functions, or algorithms within an application processing layer. For instance, the log files may be preprocessed using a noise removal engine, which may "clean" the log files (e.g., removing special characters, formatting issues, perform standardization of terms, and/or the like) to allow the subsequent algorithms to generate more accurate outputs to drive the decisioning of the overall process. Subsequently, the cleaned log files may be processed by a contextual preprocessing engine that may generate keyword representations based on the contexts in which the keywords appear within the log files.

Once the preprocessing stage is complete, the system may perform a series of checks (e.g., a first check, a second check, and the like). In this regard, the log files may be processed by a first classification algorithm, where the first classification algorithm may be an AI/ML algorithm configured to determine whether an application is impacted due to the proposed software upgrade. Accordingly, the application may analyze the preprocessed log files to determine if the application will experience issues such as crashing, freezing, lagging, and/or the like as a result of the upgrade. If the application is affected by a vulnerability but is not impacted by the upgrade, such application may be upgrade within the client layer and/or migrated and deployed into a server environment (e.g., on a server as a web application).

However, if the application is impacted by the upgrade, the system may analyze the log file associated with the application using a second classification algorithm, where the second classification algorithm may be an AI/ML algorithm configured to determine whether the impact to the application is caused by a particular condition. For instance, the second classification algorithm may be configured to determine, out of the applications experiencing issues due to the upgrade, whether the application is impacted by a software compatibility issue. In this regard, the system may attempt to remediate the software compatibility issue (e.g., by updating libraries, dependencies, operating system, enforce cybersecurity rules, and/or the like). For the applications that are no longer impacted by the compatibility issue (e.g., applications for which remediation has been successfully completed), such applications may be updated within the client layer and/or deployed to the server environment.

That said, for those application for which remediation was unsuccessful (e.g., applications that are still impacted by a compatibility issue), the system may initiate an auto-server configuration to deploy the application into a cloud environment. In this regard, an application programming interface ("API") layer between the application processing layer and the cloud environment may silently listen for an auto server configuration alert from the application processing layer, where the alert may contain configuration parameters and/or metadata for deploying the application in the cloud. In some embodiments, the cloud environment may be a multi-cloud environment which may be configured to provide infrastructure as a service ("IaaS") and/or platform as a service ("PaaS") across multiple containers or clusters, where each container or cluster may include the appropriate operating environment and resources (e.g., hardware and software resources) needed to run the application while minimizing the possibility of compatibility issues which may arise from other existing applications deployed within the production or "on-premises" environment. Based on the configuration parameters, the cloud environment may automatically generate a configuration script that, when triggered, causes one or more containers to be generated such that the applications may be deployed into the containers. In some embodiments, the system may be configured to dynamically and intelligently control the number of individual containers based on factors such as application response time, distribution of computing resources, computing loads, internal or external entity policies, and/or the like. In this way, the system may perform load balancing of applications deployed to the cloud server versus the servers within an entity's network environment, thereby optimizing application performance and compatibility.

The system as described herein provides a number of technological benefits over conventional systems or processes for applying application upgrades. In particular, through the use of AI-based preprocessing and classification algorithms, the system may intelligently determine which applications may be upgraded without issue and which applications may cause system-wide consequences as a result of the upgrade, thereby allowing for automatic deployment of the applications into various different types of environments. Furthermore, by performing load balancing of containers within the cloud environment, the system may optimize the distribution of computing resources to balance application performance with compatibility and application uptime.

FIGS. 1A-1C illustrate technical components of an exemplary distributed computing environment 100 for the system for automated and intelligent implementation of computing software upgrades. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as Transmission Control Protocol (TCP)/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for automated and intelligent implementation of computing software upgrades, in accordance with an embodiment of the present disclosure. The process begins at block 202, where the system continuously generates one or more log files associated with one or more applications in a client computing layer. The one or more log files may include information regarding or associated with one or more applications that have been deployed to an environment (e.g., the client computing layer, or the like). In this regard, such information may include, for example, application names or identifiers, names or identifiers of the host systems in which the applications have been installed or instantiated, host IP address and/or DNS information, host operating system information, application version number or identifier, log timestamps, last application boot times, last time the applications were scanned by the system, error information, application exception information, and/or the like. In other embodiments, the log files may be generated based on applications deployed to one or more servers within a server layer.

The process continues to block 204, where the system performs preprocessing of the one or more log files using one or more preprocessing engines. In some embodiments, the one or more preprocessing engines may include a noise removal engine that may be configured to read each log file, parse the log files using one or more keyword recognition processes (e.g., NLP), and transform the log files into a format that may be recognized by the first classification algorithm and/or the second classification algorithm. In this regard, transforming the log files may include removing special characters or extraneous terms, correcting syntax, modifying spacing and/or capitalization of terms, standardizing the formatting of the contents of the log files, and/or the like. The one or more preprocessing engines may further comprise a contextual preprocessing engine which may extract keywords from the one or more log files and generate associations between the keywords and certain tokenized concepts based on the context in which the keywords appear within the log files. By executing the one or more preprocessing engines on the log files, the system may ensure that the contents of the log files are formatted in a manner such that the one or more classification algorithms may be trained on the data and/or may optimally process the data.

The process continues to block 206, where the system processes the one or more log files using a first classification algorithm, wherein the first classification algorithm determines whether the one or more applications are impacted by a software upgrade. In this regard, the first classification algorithm may comprise a natural language processing algorithm that may be used by the system to, based on analyzing the logs, determine which applications may be affected by one or more issues (e.g., the application experiences operational issues such as crashing, freezing, lagging, and/or the like) as a result of a future software upgrade (e.g., an upgrade of software to the latest version) and which are unaffected by any issues, and/or which applications are experiencing such issues as a result of an implemented software upgrade. In this regard, the system may determine that a first group of applications are affected by one or more issues (e.g., impacted by the software upgrade) while a second group of applications are not affected by any issues (e.g., are not impacted by the software upgrade). In an exemplary embodiment, the system may identify 50 applications that are to be upgraded to the latest available version. The system may execute the first classification algorithm to determine which of the 50 applications are experiencing issues as a result of the software upgrade.

If a portion of the one or more applications are determined not to be impacted by the software upgrade (e.g., the first group of applications), the process continues to block 208, where the system deploys the one or more applications to one or more servers within a server environment. Continuing the example, the system may determine, through the first classification algorithm, that 30 of the 50 applications (the first group) do not or will not experience issues as a result of the software upgrade. Accordingly, the first group of applications may be greenlit by the system to be upgraded and deployed into the appropriate environments. In some embodiments, the applications may be instantiated onto one or more servers within the server environment (e.g., as web-based applications). In such embodiments, the one or more preprocessing engines may automatically generate upgrade and/or deployment configuration settings based on semantic keywords detected within the one or more log files. In other embodiments, the applications may be upgraded and deployed to the client layer onto one or more client computing systems.

However, if a portion of the one or more applications are determined to be impacted by the software upgrade (e.g., the second group of applications), the process continues to block 210, where the system processes the one or more log files using a second classification algorithm, wherein the second classification algorithm determines whether the one or more applications are impacted by a compatibility issue. The system may use additional classification algorithms to identify the reasons for the issues or failures. Continuing the example, the system may determine that the second group comprises 20 applications that experience issues as a result of the software upgrade. The system may, through the second classification algorithm, determine which of the applications are experiencing the issues because of software compatibility issues (e.g., kernel or driver issues, conflicting applications or software, and/or the like). The system may attempt to execute one or more remediation processes for remedying software compatibility issues within the production environment. For instance, the one or more remediation processes may include updating operating system files, kernels, or drivers, updating libraries or other dependencies, and/or the like.

It should be understood that while the second classification algorithm is described with respect to detecting software compatibility issues of the one or more applications, other types of classification algorithms may be used to more specifically identify the root issues for the upgrade issues (e.g., algorithms to check which applications are affected by hardware compatibility issues, which applications are affected inadequate resource allocation issues, and/or the like). Furthermore, it should be understood that the system may use additional algorithms (e.g., a third classification algorithm, fourth classification algorithm, and the like) to further classify the issues experienced by the applications as a result of the software upgrade. For instance, the system may use a third classification algorithm to determine which of the applications experiencing issues because of software compatibility are experiencing such issues because of driver conflicts.

After executing the remediation processes, if the one or more applications are determined not to be impacted by the compatibility issue (e.g., a third group of applications), the process proceeds to block 208, where the system deploys the one or more applications to one or more servers within a server environment. In this regard, the third group of applications may include the applications for which the software compatibility issues have been successfully remediated. As such, such applications may be greenlit to be updated and deployed within their appropriate environments (e.g., the client and/or server layer).

However, if the one or more applications are determined to be impacted by the compatibility issue (e.g., a fourth group of applications), the process continues to block 212, where the system generates an auto configuration script for deploying the one or more applications to a cloud environment. In this regard, the fourth group of applications may represent the applications for which remediation has been unsuccessful. As such, the fourth group of applications may require a dedicated environment that provides the dependencies and resources necessary for the applications to be updated and deployed without issues. Accordingly, the system may query the cloud environment to determine whether the cloud environment is able to provide a compatible hardware and software environment for the applications within the fourth group. If the system determines that compatible hardware and software environment is available, the system may generate the auto configuration script. The auto configuration script may be a .yaml file that includes information such as application state information, installation paths, dependencies, resource requirements, and/or the like, and, when executed, automatically prepares the cloud environment and deploys the applications into the cloud environment based on the parameters set in the auto configuration script.

The process continues to block 214, where the system executes the auto configuration script to deploy the one or more applications into one or more containers within the cloud environment. The auto configuration script may designate the number of containers to be generated within the cloud environment to deploy the applications. The number of containers may be determined based on the needs of the various applications. For instance, in one embodiment, the auto configuration script may generate one container per application to be deployed. In other embodiments, such as when certain applications are to be installed within the same environment, one or more applications may share a container. Furthermore, each of the containers may provide the dependencies and resources needed for the application to be deployed. For example, an application may, in order to run without issues, have certain hardware compatibility requirements (e.g., an amount of allocated memory, storage space, processing power, processing cores, and/or the like), as well as certain software compatibility requirements (e.g., drivers, libraries, application dependencies, operating system requirements, kernel version requirements, and/or the like). Accordingly, each container generated within the cloud environment may be generated according to the software and hardware requirements for each application. Through the use of cloud-based IaaS and PaaS technologies, the system provides a way to safely and intelligently perform software upgrades of applications while minimizing the incidence of issues or application downtime as a result of such upgrades.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated and intelligent implementation of computing software upgrades, the system comprising:

a processing device; and a non-transitory storage device containing instructions, when executed by the processing device, causes the processing device to:

generate one or more log files associated with one or more applications in a client computing layer, wherein the one or more applications are updated by a software upgrade requiring verification before deploying to at least one of a user device or a server environment;

perform preprocessing of the one or more log files using one or more preprocessing algorithms;

analyze the one or more log files using a first classification algorithm, wherein the first classification algorithm comprises a natural language processor (NLP) and the NLP determines whether the one or more applications are impacted by the software upgrade based on a shared classification of the one or more applications;

determine, using the first classification algorithm, one or more impacted applications that require compatibility verification;

analyze the one or more log files of the one or more impacted applications using a second classification algorithm, wherein the second classification algorithm determines whether the one or more impacted applications are impacted by a compatibility issue;

determine, using the second classification algorithm, one or more verified applications that operate without the compatibility issue;

deploy the one or more verified applications to at least one of the user device or the server environment; and in response to determining that a second group of applications of the one or more applications are impacted with the compatibility issue by the software upgrade and that a remediation procedure associated with the second group of applications is unsuccessful;

generate an auto configuration script for deploying the second group of applications to a cloud environment, wherein the auto configuration script designates a number of containers to be generated within the cloud environment and wherein the number of containers is associated with one or more hardware requirements and one or more software requirements of the second group of applications; and execute the auto configuration script to deploy the second group of applications into one or more generated containers within the cloud environment, wherein the cloud environment is a dedicated environment for the second group of applications providing dependencies and resources for the second group of applications to be deployed.

2. The system of claim 1, wherein processing the one or more log files using the first classification algorithm comprises:

determine that a first group of applications of the one or more applications is not impacted by the software upgrade; and deploy the first group of applications to one or more servers within the server environment.

3. The system of claim 1, wherein the one or more preprocessing algorithms comprises a noise removal algorithm, wherein the noise removal algorithm is configured to perform at least one of syntax correction, removal of special characters, or formatting changes on the one or more log files.

4. The system of claim 1, wherein the one or more preprocessing algorithms comprises a contextual embedding algorithm, wherein the contextual embedding algorithm is configured to generate associations between one or more keywords detected in the one or more log files and identified concepts within the one or more log files.

5. The system of claim 1, wherein the compatibility issue comprises a software compatibility issue caused by at least one of a driver conflict, operating system conflict, or outdated libraries.

6. A computer program product for automated and intelligent implementation of computing software upgrades, the computer program product comprising a non-transitory computer-readable medium comprising code causing an apparatus:

generate one or more log files associated with one or more applications in a client computing layer, wherein the one or more applications are updated by a software upgrade requiring verification before deploying to at least one of a user device or a server environment;

perform preprocessing of the one or more log files using one or more preprocessing algorithms;

analyze the one or more log files using a first classification algorithm, wherein the first classification algorithm comprises a natural language processor (NLP) and the NLP determines whether the one or more applications are impacted by the software upgrade based on a shared classification of the one or more applications;

determine, using the first classification algorithm, one or more impacted applications that require compatibility verification;

analyze the one or more log files of the one or more impacted applications using a second classification algorithm, wherein the second classification algorithm determines whether the one or more impacted applications are impacted by a compatibility issue;

determine, using the second classification algorithm, one or more verified applications that operate without the compatibility issue;

deploy the one or more verified applications to at least one of the user device or the server environment; and in response to determining that a second group of applications of the one or more applications are impacted with the compatibility issue by the software upgrade and that a remediation procedure associated with the second group of applications is unsuccessful;

generate an auto configuration script for deploying the second group of applications to a cloud environment, wherein the auto configuration script designates a number of containers to be generated within the cloud environment and wherein the number of containers is associated with one or more hardware requirements and one or more software requirements of the second group of applications; and execute the auto configuration script to deploy the second group of applications into one or more generated containers within the cloud environment, wherein the cloud environment is a dedicated environment for the second group of applications providing dependencies and resources for the second group of applications to be deployed.

7. The computer program product of claim 6, wherein processing the one or more log files using the first classification algorithm comprises:

determine that a first group of applications of the one or more applications is not impacted by the software upgrade; and deploy the first group of applications to one or more servers within the server environment.

8. The computer program product of claim 6, wherein the one or more preprocessing algorithms comprises a noise removal algorithm, wherein the noise removal algorithm is configured to perform at least one of syntax correction, removal of special characters, or formatting changes on the one or more log files.

9. The computer program product of claim 6, wherein the one or more preprocessing algorithms comprises a contextual embedding algorithm, wherein the contextual embedding algorithm is configured to generate associations between one or more keywords detected in the one or more log files and identified concepts within the one or more log files.

10. A computer-implemented method for automated and intelligent implementation of computing software upgrades, the computer-implemented method comprising:

generating one or more log files associated with one or more applications in a client computing layer, wherein the one or more applications are updated by a software upgrade requiring verification before deploying to at least one of a user device or a server environment;

performing preprocessing of the one or more log files using one or more preprocessing algorithms;

analyzing the one or more log files using a first classification algorithm, wherein the first classification algorithm comprises a natural language processor (NLP) and the NLP determines whether the one or more applications are impacted by the software upgrade based on a shared classification of the one or more applications;

determining, using the first classification algorithm, one or more impacted applications that require compatibility verification;

analyzing the one or more log files of the one or more impacted applications using a second classification algorithm, wherein the second classification algorithm determines whether the one or more impacted applications are impacted by a compatibility issue;

determining, using the second classification algorithm, one or more verified applications that operate without the compatibility issue;

deploying the one or more verified applications to at least one of the user device or the server environment; and in response to determining that a second group of applications of the one or more applications are impacted with the compatibility issue by the software upgrade and that a remediation procedure associated with the second group of applications is unsuccessful;

generating an auto configuration script for deploying the second group of applications to a cloud environment, wherein the auto configuration script designates a number of containers to be generated within the cloud environment and wherein the number of containers is associated with one or more hardware requirements and one or more software requirements of the second group of applications; and executing the auto configuration script to deploy the second group of applications into one or more generated containers within the cloud environment, wherein the cloud environment is a dedicated environment for the second group of applications providing dependencies and resources for the second group of applications to be deployed.

11. The computer-implemented method of claim 10, wherein processing the one or more log files using the first classification algorithm comprises:

determining that a first group of applications of the one or more applications is not impacted by the software upgrade; and deploying the first group of applications to one or more servers within the server environment.

12. The computer-implemented method of claim 10, wherein the one or more preprocessing algorithms comprises a noise removal algorithm, wherein the noise removal algorithm is configured to perform at least one of syntax correction, removal of special characters, or formatting changes on the one or more log files.

13. The computer-implemented method of claim 10, wherein the one or more preprocessing algorithms comprises a contextual embedding algorithm, wherein the contextual embedding algorithm is configured to generate associations between one or more keywords detected in the one or more log files and identified concepts within the one or more log files.

14. The computer-implemented method of claim 10, wherein the compatibility issue comprises a software compatibility issue caused by at least one of a driver conflict, operating system conflict, or outdated libraries.

* * * * *